Oct. 17, 1961 W. R. AIKEN 3,005,124
ELECTRONIC DEVICE
Filed April 11, 1957 3 Sheets-Sheet 1
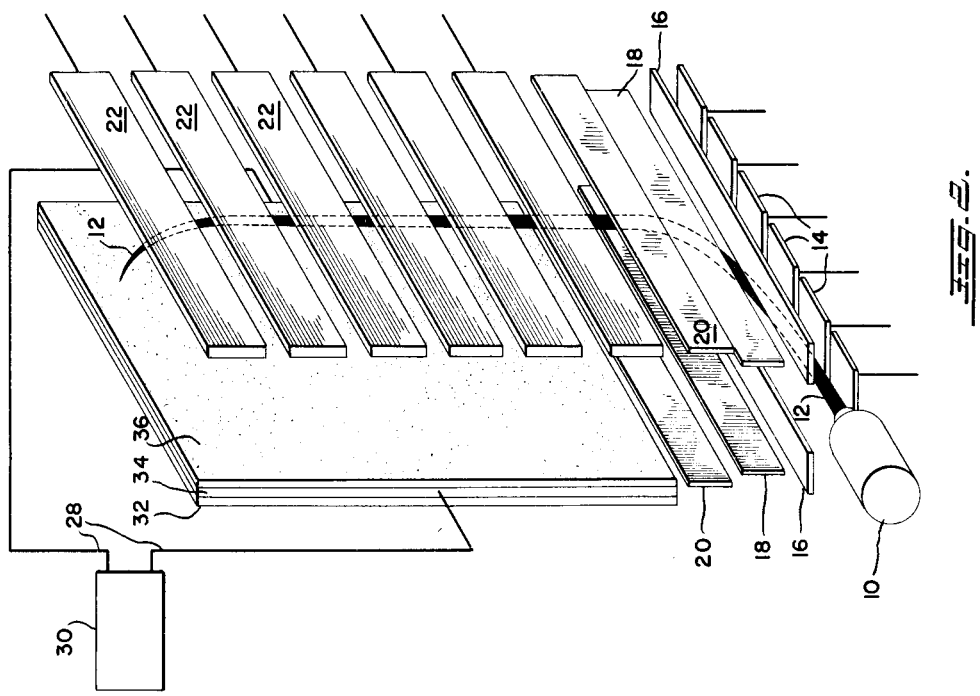
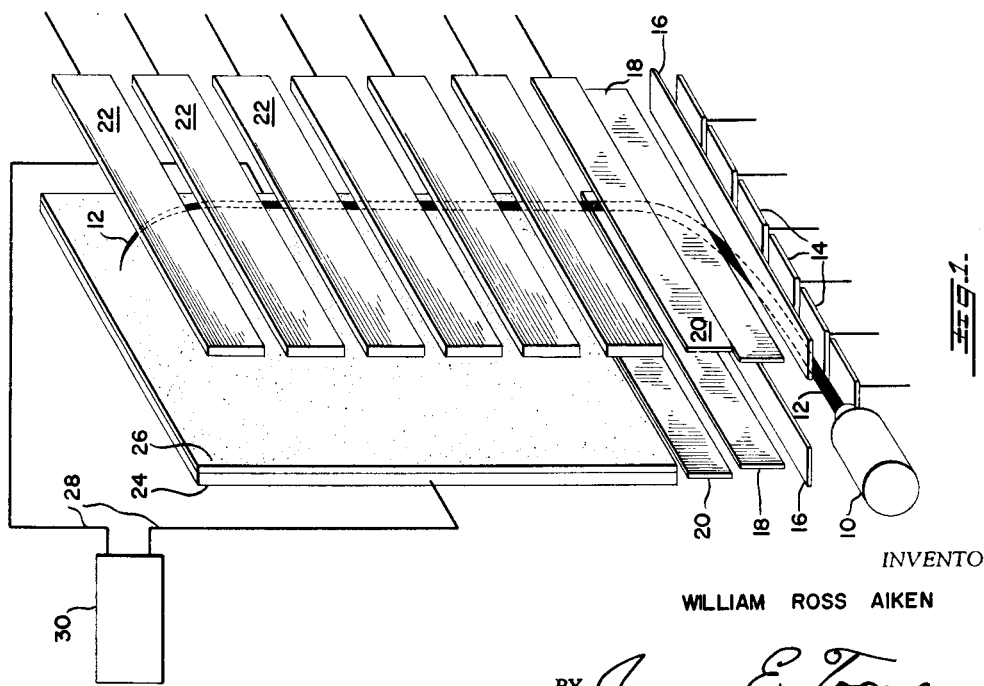
INVENTOR
WILLIAM ROSS AIKEN
BY James E. Toomey
ATTORNEY

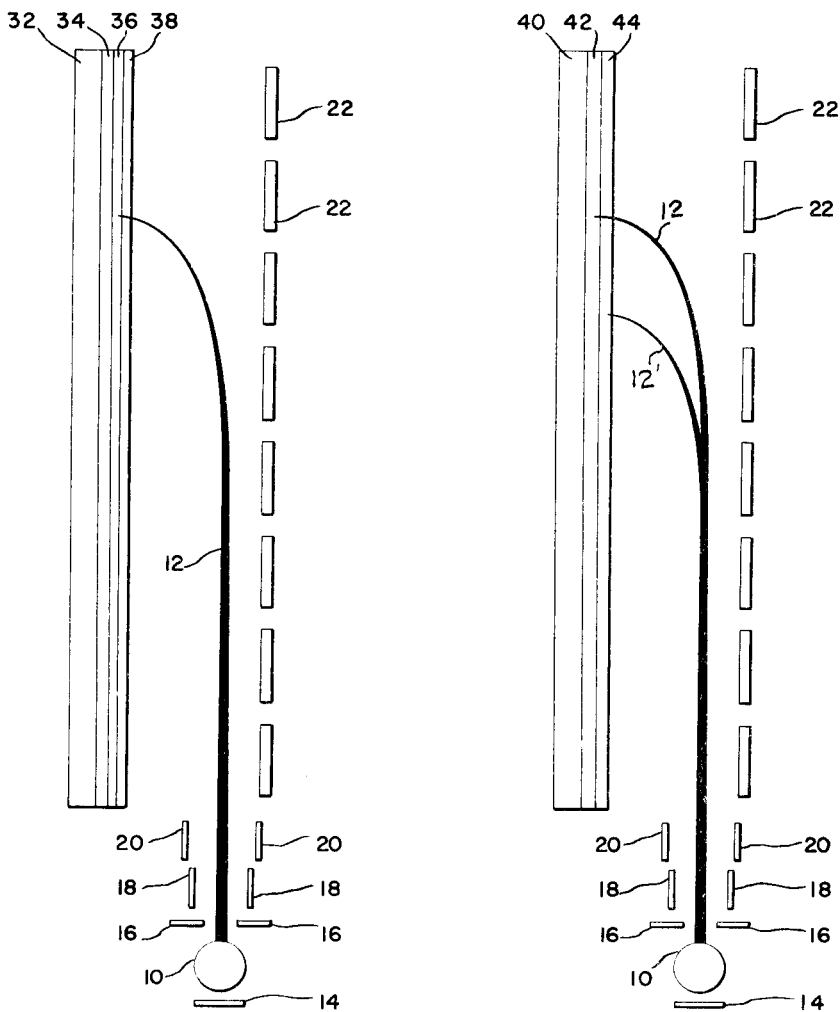

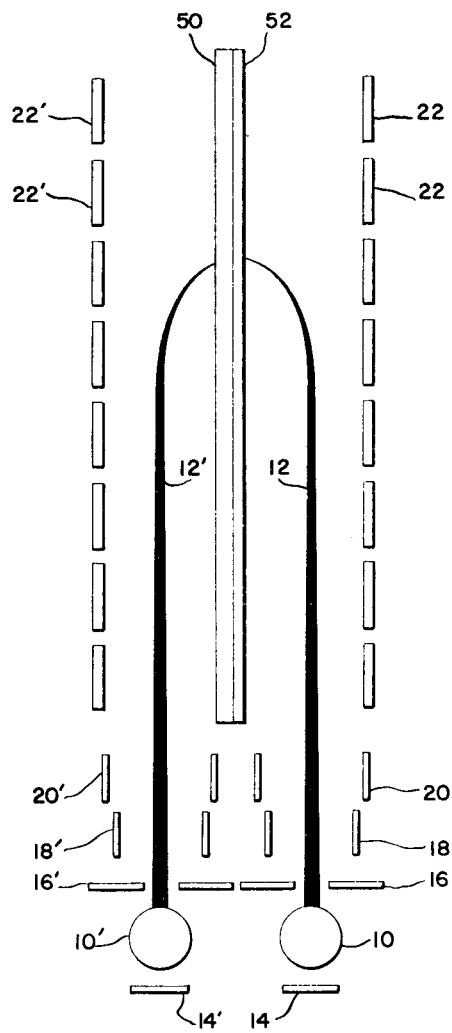

3,005,124
ELECTRONIC DEVICE

William Ross Aiken, Los Altos, Calif., assignor, by mesne assignments, to Kaiser Industries Corporation, a corporation of Nevada
Filed Apr. 11, 1957, Ser. No. 652,245
6 Claims. (Cl. 313—92)

The present invention relates to electronic display devices having a display screen employing dark trace phosphors and more particularly to a method and means for effecting display of information on the screen arrangement having means provided for effecting rapid and efficient erasure thereof.

In the electronics field of today, the use of dark trace phosphor for the display of information has found many and varied applications in the commercial as well as military fields. Basically, the dark trace phosphors are utilized wherein it is desired to impress informational data on a screen and retain it for considerable periods of time.

Among the advantageous features of dark trace phosphors is their ability to retain the information which has been impressed thereon for considerable periods which is obviously desirable where the information displayed is to be studied or compared. However, attendant with this advantage is the disadvantage of being unable to rapidly erase the information displayed.

Dark trace phosphors are normally energized or actuated by bombarding them with a beam of electrons. However, in order to eradicate the information it is necessary to apply heat to the energized areas of the phosphor. Crystals employed as dark trace phosphors are generally alkali halides characterized by having such a uniform diffuse reflectance that the material appears very white when viewed with white light. These crystals develop absorption bands for light within the visible range of wavelengths subsequent to bombardment by electrons. The phenomenon of these induced absorption bands is invariably associated with ionic crystals, of which potassium chloride (one of the most widely used dark trace phosphors) is typical. After the absorption band has been created, the enhanced absorption of green light causes the diffusely reflected light to be rich in red and blue and therefore to appear magenta.

In the absence of strong light, heat, or additional electron excitation, the induced absorption band becomes effectively frozen. If weak light is used to view the excited screen, the presence of the induced absorption in all regions that have been bombarded by electrons is evident and if the tube is kept in a dark area at room temperature almost no reduction in the absorption occurs.

The hitherto mentioned induced absorption band effected in the phosphor material may be caused to change through the application of heat thereby allowing the phosphor to return to its original state.

The devices of the prior art employing dark trace phosphors which have utilized a conventional cathode ray tube structure have disposed the phosphor target at one end of the tube and an electron gun arrangement at the other end with suitable deflection means for effecting the desired scanning of the beam across the target.

One of the attempts to erase the information impressed on the target of such tubes employ a structure wherein a heater grid assembly is disposed in adjacent spaced relation with the target and intermediate the target and the electron gun. When the information impressed on the target is to be erased, the heater grid is energized by an auxiliary power supply which in turn heats the phosphor material by the radiated heat to thereby deactivate the activated areas of the target. The heater grid gives off radiated heat energy not only in a direction toward the target but also in the opposite direction from the target in the inner portion of the tube envelope. Due to the fact that the heater grid and the target are spaced apart, the heating curves of the two are somewhat different. Assuming that it is necessary to heat the phosphor material to the order of 200° F., it will be necessary in certain applications to heat the heater grid to approximately 1000° F. in order to effect a rapid erase. Then prior to a subsequent writing cycle the heat built up in the tube must necessarily be dissipated to allow the phosphor material to cool enough to be subsequently energized by the electron beam to vary the absorption properties thereof. The heat decay time in these tubes is too slow for many of the applications for which such tubes are considered to be useful.

Another prior art device employing a dark trace phosphor target utilizes a structure wherein heater coils are employed and disposed near the reduced neck portion of the tube envelope. The inner surface of the tube is mirrored in the vicinity of the coils in order to reflect the radiant heat energy therefrom toward the target. This device overcomes one of the problems attendant with the former tube in which the heater grid was disposed intermediate the target and the electron gun. Manifestly, with such an arrangement certain of the electrons must of necessity impinge on the heater grid forming shadows on the target which reduced the fidelity of the information display. With the use of heater coils disposed around the inner surface of the tube envelope this problem is overcome. However, the same problem of heat dissipation is nevertheless present.

Clearly, it will be understood that the conventional tubes cannot make use of an opaque support for the phosphor target screen. The advent of the thin tube or the Aiken tube is described in detail in the copending application Serial No. 396,120, filed December 4, 1953, now Patent No. 2,795,731, which may be viewed from two sides allows the employment of a thin opaque support for the phosphor. The support may be used to heat the dark trace phosphor for erasure directly and without loss of an appreciable amount of heat through radiation.

The present invention obviates the aforementioned problems through the employment of a cathode ray tube incorporating the deflection features of the Aiken type cathode ray tube as described in the above mentioned copending application Serial No. 396,120, now Patent No. 2,795,731. In one embodiment, the invention comprises a cathode ray tube having the primary section and transition sections of an Aiken tube as described in the aforementioned copending application. The high voltage section of the tube incorporates a plurality of transparent deflection plates and a target of dark trace phosphors supported on a thin electrically conductive plate coupled to a source of electrical power. The supporting plate is formed of material characterized by having relatively low heat capacity. Information is impressed on the target in the manner characteristic of the Aiken tube. Rapid erasure of the impressed information is achieved by electrically heating the supporting plate of the target assembly. Inasmuch as the dark trace phosphor material is in intimate contact with the supporting plate, the phosphor is heated directly and very little heat is lost by radiation. Further, due to the low heat capacity of the supporting plate, the heat built up in the target assembly will be quickly dissipated permitting a rapid rewrite.

The invention will be clearly understood by reading the following detailed description in connection with the drawings in which:

FIG. 1 is a perspective view of the internal components of the cathode ray tube of the present invention;

FIG. 2 is a modified form of the target arrangement;

FIG. 3 shows a modified version of the target arrangement shown in FIG. 2;

FIG. 4 is another modified form of the target screen arrangement illustrating a method and means for impressing and erasing information thereon using a single electron gun; and FIG. 5 shows another embodiment of the invention employing two electron gun arrangements.

The general description of the configuration and operation of the Aiken type tube in its most basic arrangement is set forth herewith for the purpose of simplifying the explanation of the specific invention and its various embodiments. The Aiken type tube as shown in FIG. 1 comprises a housing, not shown, within which are located an electron gun 10; a primary section, including a plurality of horizontal deflection plates 14 and a slotted electrode 16; a transition section, including two sets of focusing electrodes 18 and 20; and a high voltage section, including a plurality of vertical deflection plates 22 and a target comprising a supporting plate 24 and a layer 26 of phosphor material.

In operation, selected areas on the phosphor screen are electronically excited by an electron beam 12 delivered by the gun 10. In the illustrated arrangement, the electron gun 10 is located at the lower left hand corner of the viewing screen and is adapted to deliver a beam along the lower horizontal edge of the phosphor screen in a field-free region adjacent the horizontal deflection plates 14 and below the slotted electrode 16. Control means affect the application of voltages in sequence to each of the horizontal deflection plates 14 to effect bending of the beam vertically at successive points along the edge of the tube through the transition section comprised of the two pairs of focusing electrodes 18 and 20 and into a second field-free region between the transparent flat deflection plates 22 and the electrically charged target screen comprised of the supporting plate 24 and the phosphor layer 26. Deflection of the beam 12 onto the screen at the vertical level is achieved by effecting the application of voltages of appropriate values to corresponding ones of the vertical deflection plates 22.

The phosphor layer 26 is comprised of a dark trace phosphor such as potassium chloride being characterized by its ability to retain information displayed thereon for relatively long periods of time. The material is of such a nature that it can be readily energized upon impingement thereon by a beam of electrons and will be maintained in its energized state. In order to de-energize the phosphor material of this type it is necessary to apply heat energy thereto. Accordingly, in one embodiment of the invention, as illustrated in FIG. 1, the supporting plate 24 may be formed of a material such as metal foil of sufficient rigidity to support the phosphor layer 26. However, many other materials which are characterized by their ability to be heated by the conduction of electrical energy therethrough may be likewise satisfactorily employed. The supporting plate 24 is connected to a high voltage power supply 30 by a pair of suitable electrical conductors 28. The power supply 30 is adapted to pass current through the supporting plate 24 and due to the electrical resistance characteristics of the material, heat will be developed in the plate 24. The heat thus produced passes directly to the phosphor material 26 thereby effectively erasing any information which has been impressed thereon by the electron beam 12. Manifestly, complete area erasure of the target may be achieved rapidly due to the thinness of the supporting plate 24 and the intimate contact between the plate 24 and the phosphor layer 26. Prior to the time the target may be energized again by electron impingement, the heat developed in the phosphor material must be dissipated. Heat dissipation is effected rapidly due to the low heat capacity of the supporting plate 24 and accordingly, the next writing cycle may be commenced to impress information on the target with little delay.

Manifestly, the device illustrated in FIG. 1 may be viewed from only a single side of the tube and in certain applications it may be desirable to view the display from each of the two sides. The embodiment illustrated in FIG. 2 shows such an arrangement wherein the primary and transition sections are identical with that shown and described in connection with FIG. 1. In this embodiment, a thin layer 34 of tin oxide is deposited on a glass supporting plate 32. A layer of dark trace phosphur material 36 is deposited on the tin oxide layer 34. The power supply 30 is connected to the tin oxide layer 34 through the electrical conductors 28. The tin oxide layer 34 is an electrical conductor and also is optically transparent. When electrical energy is passed through the tin oxide layer 34 by the power supply 30, heat is developed therein which in turn transmits heat to the phosphor material 36. Accordingly, erasure of information displayed on the target may be effected by passing current through the tin oxide layer 34. Due to the transparency of the deflection plates 22 on one side and the glass supporting plate 32 and tin oxide layer 34, the information displayed on the phosphur layer 36 may be viewed from two sides.

FIG. 3 shows a modified version of the target arrangement described in connection with FIG. 2. It will be noted that an additional layer 38 is disposed on top of phosphor layer 36. The layer 38 is of material which is pervious to light and electrons and further functions as a thermal barrier to increase the heat retained in the phosphor layer 36 during the erase phase of operation. Thus, this embodiment militates against the loss of excess amounts of heat from the target assembly during the erase phase.

FIG. 4 shows another arrangement for impressing information on a target screen employing dark trace phosphor material and also a method of erasing the information displayed. The erasure may be accomplished in a selective manner rather than erasure of the entire target area. Selective erasure is accomplished in this arrangement by the employment of a dual energy electron beam.

It will be noted that the target assembly includes a glass supporting plate 40 upon which a layer 42 of dark trace phosphor material is applied. A layer 44 of aluminum is applied to the phosphor layer 42. Information is impressed on the phosphor material 42 in the same manner as described above in connection with the earlier mentioned arrangements. However, in this arrangement the erasing process is accomplished through use of an electron beam which is effective to accomplish heating of only selected areas of the target. A high velocity, low current beam 12 is used to write, while a relatively low velocity, high current beam 12' is used to erase by locally heating the aluminum layer 44. In one embodiment, it was found that a 100 microamp., 13 kv. beam was satisfactory to write and a 400 microamp., 9 kv. beam was satisfactory to erase. The erasing beam 12' functions to heat only localized portions of the aluminum layer 44 which is in intimate contact with the phosphor 42 without penetrating the aluminum.

This method of erasing is very efficient as the heat developed in the aluminum layer 44 is applied directly to the phosphor layer 42 thereby substantially reducing the build up of heat in the tube envelope. Rapid cooling is likewise assured as the glass supporting plate 40 is also in contact with the phosphor layer 42 and serves to conduct away the heat rapidly when the erasing beam 12' is cut off.

FIGURE 5 illustrates a two electron gun arrangement, wherein one gun is used to write and the other may be used to erase the written information. The embodiment of FIG. 5 employs two sets of operating components which are substantially identical with those described in connection with FIGURE 1. However, it can be easily seen that the individual components making up an operation arrangement are disposed in superposed relationship. A single target arrangement similar to the target illustrated in FIGURE 1 is disposed intermediate the two vertical deflection systems, one of which is indicated by the same reference numerals used in FIG. 1 which the other deflection system is indicated by the prime numerals.

The target arrangement comprises a supporting plate 50 which may be formed of a thin metal foil or any other material which will conduct electrical and heat energy while having a low heat capacity rating. One surface of the supporting plate 50 is coated with a dark trace phosphor material. The electron beam 12 is employed as a writing beam while beam 12' is employed as an erasing beam. The electron beam 12' is characterized by being of relatively high current and thus when caused to impinge on the back side of the supporting plate 50 will tend to heat only that portion of the plate impinged. The heat created by electron impingement on the back of the plate 50 will likewise heat the phosphor material 52. Accordingly, it is possible to erase only selected portions of the information displayed on the target.

It will be readily apparent that only one-way viewing of the displayed information is possible in the event that the plate 50 is formed of an opaque material. However, the material used for the plate 50 may be transparent if desired, thereby allowing for two-way viewing.

From the preceding description of the invention it will be apparent to those skilled in the art, that the arrangement has application in many environments in the electronics field, among the more obvious application is in memory tubes and the like.

According to the provisions of the patent statutes, I have explained the priciples and mode of operation of my invention, and have illustrated and described what I now consider to represent its best embodiment. However, I desire to have it understood that, within the scope of the appended claims, the invention may be practiced otherwise than as specifically illustrated and described.

I claim:

1. An electron discharge device including a target comprised of an electrically conductive metallic imperforate supporting plate, a phosphor layer disposed in intimate contact with one surface of said target capable of effecting continued light emission responsive to excitation by an electron beam, means for initially delivering an electron beam selectively into registration with different portions of the imperforate metallic surface of the target at a relatively high velocity sufficient to effect the penetration of said metallic surface and to effect registration of information on the phosphor adjacent thereto, and means for thereafter controlling said beam to strike said metallic surface at a relatively low velocity to selectively heat different portions of said metallic surface without penetrating therethrough to thereby effect the erasure of the information registered on the adjacent portions of the phosphor layer.

2. An electron discharge device including an electron sensitive target which is comprised of an electrically conductive imperforate supporting plate and a layer of dark trace phosphor material disposed on one surface thereof in intimate contact with the plate, whereby heating of the plate effects heating of the adjacent phosphor material by conduction, an electron beam source for delivering a beam of electrons along a given path adjacent and substantially parallel to said target, deflection means for applying deflecting forces to said beam at different successive intervals thereof to deflect same from said path at said intervals into registration with correspondingly different intervals of said target to thereby effect the energization thereof, at least one of the members of the group including said supporting plate and said deflection means being transparent, and means for heating said conductive plate to conduct heat to said phosphor to de-energize the energized portions of said target.

3. An arrangement as set forth in claim 2 which incudes a thermal barrier layer which is penetrable by said beam disposed adjacent said dark trace phosphor material.

4. An electron discharge device including an electron sensitive target which is comprised of a metallic imperforate supporting plate and a layer of dark trace phosphor material disposed on one surface thereof, means for delivering a first beam of electrons along a given path adjacent the outer surface of the phosphar material, means disposed in substantially parallel relation with the phosphor surface of said target for applying deflecting forces to different intervals of said beam to cause same to be deflected from said path at the different intervals into registration with correspondingly different areas on the phosphor surface of said target to effect the energization thereof; means for delivering a second beam along a second given path adjacent the plate surface of the target, and means disposed in substantially parallel relation with the metallic surface of said target for applying deflecting forces to different intervals of said beam to cause same to be deflected from said path at the different intervals and into registration with correspondingly different areas of the plate surface of said target to effect the heating of such portions and the de-energization of the coextensive portion of the phosphor surface as energized.

5. An electron discharge device including an electron sensitive target, said target comprising a layer of dark trace phosphor material and an imperforate layer of metallic material disposed on one surface thereof, an electron beam source means for delivering a beam to a zone adjacent a surface of said target including means for establishing a beam of at least two discrete energy levels, and deflection means for deflecting said beam of said first and second energizing levels into registration with said target, the beam at its higher energy level beam being of a value sufficient to penetrate said metal layer and impinge on said phosphor and the lower energy level beam being of a value which permits absorption thereof by said metal layer to thereby heat the same.

6. A phosphor screen assembly for an electron discharge device comprising an electrically conductive imperforate supporting plate, a phosphor layer disposed in intimate contact with one surface of said plate, said phosphor layer being a dark trace phosphor material being selected from the group of alkali halides, and a layer of material disposed on said phosphor layer, said material permitting the passage of only high energy electrons therethrough to effect the registration of information on said phosphor layer, and being capable of absorbing low energy electrons to heat same at the points of impact therewith to effect the erasure of the information registered on the adjacent phosphor layer.

References Cited in the file of this patent

UNITED STATES PATENTS

| | | |
|---|---|---|
| 2,276,359 | Von Ardenne | Mar. 17, 1942 |
| 2,402,758 | Leverenz | June 25, 1946 |
| 2,402,761 | Leverenz | June 25, 1946 |
| 2,532,339 | Schlesinger | Dec. 5, 1950 |
| 2,575,033 | Szegho | Nov. 13, 1951 |
| 2,713,116 | Raibourn | July 12, 1955 |
| 2,719,241 | Coltman | Sept. 27, 1955 |
| 2,730,653 | Schagen | Jan. 10, 1956 |
| 2,836,754 | Holborn | May 27, 1958 |
| 2,863,091 | Epstein | Dec. 2, 1958 |
| 2,874,377 | Lawlor | Feb. 17, 1959 |